United States Patent

Baumgartner et al.

Patent Number: 5,223,577
Date of Patent: Jun. 29, 1993

[54] ABS MOLDING MATERIALS

[75] Inventors: Ehrenfried Baumgartner, Roedersheim-Gronau; Juergen Hofmann, Ludwigshafen; Rainer Moors, Limburgerhof; Hansjoerg Schaech, Ludwigshafen; Rainer Bueschl, Roedersheim-Gronau; Rudolf H. Jung, Worms, all of Fed. Rep. of Germany

[73] Assignee: BASF Aktiengesellschaft, Ludwigshafen, Fed. Rep. of Germany

[21] Appl. No.: 707,899

[22] Filed: May 30, 1991

[30] Foreign Application Priority Data

Jun. 1, 1990 [DE] Fed. Rep. of Germany ....... 4017680
Sep. 26, 1990 [DE] Fed. Rep. of Germany ....... 4030351

[51] Int. Cl.$^5$ .............. C08L 33/08; C08L 33/20; C08L 25/06; C08L 53/02; C08L 71/12; C08L 33/10

[52] U.S. Cl. .................... 525/149; 525/68; 525/92; 525/53; 525/152; 525/216; 525/222; 525/238; 525/241; 525/905

[58] Field of Search ............ 525/68, 92, 149, 152, 525/905, 216, 222, 238, 241, 53

[56] References Cited

U.S. PATENT DOCUMENTS 4,118,348 10/1978 Bennett et al. ............... 525/149
4,283,511 8/1981 Ueno et al. .................. 525/132

FOREIGN PATENT DOCUMENTS 1117692 2/1982 Canada ..................... 525/149
0111588 6/1984 European Pat. Off. .
0167707 1/1986 European Pat. Off. .

Primary Examiner—James J. Seidleck
Assistant Examiner—Thomas Hamilton, III
Attorney, Agent, or Firm—Oblon, Spivak, McClelland, Maier & Neustadt

[57] ABSTRACT

A rubber-modified, impactresistant acrylonitrile-butadiene-styrene (ABS) molding material, as obtained by polymerizing styrene and acrylonitrile in the presence of a preformed rubber, dissolved in monomeric styrene and acrylonitrile and, if necessary, a solvent, wherein the rubber is a styrene-butadiene block copolymer and at least one further polymer which is compatible with the styrene-butadiene block rubber or its polystyrene component and is incompatible with polystyrene-acrylonitrile.

8 Claims, No Drawings

ABS MOLDING MATERIALS

The present invention relates to a rubbermodified, impact-resistant acrylonitrile-butadiene-styrene (ABS) molding material.

ABS molding materials may be prepared by bulk, solution, suspension or emulsion polymerization, as desired (see Winnacker-Küchler, Chemische Technologie, Volume 6, Organische Technologie II, Carl Hanser Verlag, 4th Edition, 1982, pp. 384 ff.; Encyclopedia of Polymer Science and Engineering, Volume 1, John Wiley & Sons, New York—Chichester—Brisbana—Toronto—Singapore, pp. 388-424; Polymere Werkstoffe, Volume III, Technologie 2, Editor H. Batzer, Georg Thieme Verlag, Stuttgart—New York, 1984, pp. 9-23).

The mechanical properties of the ABS molding materials polymerized in bulk or solution on the one hand and those prepared in emulsion on the other hand are substantially identical. The advantage of the bulk or solution process is, in particular, the lower production costs (inter alia higher rubber effectiveness, no effluent) and the paler inherent color of its products, requiring less pigment for coloring. However, these products have the disadvantage compared with ABS prepared in emulsion of lower surface gloss, which is attributable to the fact that ABS polymerized in bulk or solution has significantly larger dispersed rubber particles.

There has therefore been a number of attempts to overcome this problem by appropriate modifications to the process and to prepare ABS with very small dispersed rubber particles by bulk or solution polymerization.

Solution ABS with small particles and good surface gloss can be prepared using either particularly low-molecular-weight polybutadiene (cf. JA-A-63/199,177) or styrene-butadiene block rubber (cf. EP 0 054 141, JA-A-63/207,804, JA-A-63/207,803 and JA-A-54/070,350), or by observing specific reaction conditions during or until phase inversion.

It is common to all the products produced in this way that they have high surface gloss, but low notched impact strength, since the rubber concentration in the solution or bulk polymerization process cannot be increased at will. In order to increase the rubber effectiveness of the solution ABS with small particles, attempts have been made to accommodate hard matrix occlusions in the dispersed rubber particles. To this end, polybutadiene, together with styrene-butadiene block rubber and polystyrene-acrylonitrile, has been dissolved and polymerized in styrene and acrylonitrile (cf. BE 888 804). The gel content of the resultant graft rubber increases due to included polystyrene-acrylonitrile. However, due to the compatibility with the polystyrene-acrylonitrile matrix itself formed in the process, the added polystyrene-acrylonitrile is distributed between this matrix and the rubber particles, which means that a very large amount of polystyreneacrylonitrile must be added even before the polymerization in order to effectively increase the rubber particle size; however, this results in viscosity problems during the polymerization before phase inversion.

A similar procedure is described in U.S. Pat. No. 3,442,981, with the polybutadiene being replaced only by styrene-butadiene block rubber.

GB 1,229,917 proposes the bulk suspension polymerization of a styrene solution of polybutadiene and polystyrene to give impact-resistant polystyrene. Here again, it is expected that the polystyrene added before the polymerization is distributed between the two phases rubber and polystyrene. The increase in the rubber effectiveness is probably only marginal. The same applies if the process is carried out exclusively by suspension polymerization (cf. GB 1,243,051).

It is an object of the present invention to prepare high-gloss and simultaneously high impact strength ABS molding materials by solution or bulk polymerization and to achieve greater effectiveness with respect to the formation of rubber occlusions.

We have found that this object is achieved by dissolving one or more styrene-butadiene block rubbers, together with at least one further polymer, in the initially introduced monomers, ie. styrene and acrylonitrile, and, if necessary, a solvent and then polymerizing the mixture in a conventional manner.

For the purposes of the present invention, further polymers are various types of polymer.

A particularly important polymer is polystyrene itself.

Another likewise suitable polymer is polycyclohexyl (meth)acrylate.

A further polymer which satisfies the same requirements as polystyrene or polycyclohexyl (meth)acrylate is polyphenylene ether.

In addition, the "further" polymer may be a mixture of the abovementioned polymers, for example a mixture of polystyrene and polycyclohexyl (meth)acrylate or polystyrene and polyphenylene ether. An important embodiment of the invention replaces the styrene-butadiene block copolymer by a mixture of a styrene-butadiene block copolymer and polybutadiene.

In a further, important embodiment of the invention, the molding material additionally contains a conventional solution ABS, ie. a graft copolymer ("solution ABS") prepared by solution, bulk or bulk-suspension polymerization and having main chains comprising polybutadiene and graft branches of a copolymer comprising styrene and acrylonitrile; this molding material has a mean rubber particle size of 0.6 to 10 $\mu$m, and its polymer inclusions in the rubber particles have an identical chemical composition to the polymeric matrix.

The following details apply to carrying out the process in practice:

The further polymer added before the polymerization must be compatible with the polystyrene of the styrene-butadiene rubber, ie. must be fully or substantially soluble therein (cf. A. Noshay, Block Copolymers, pp. 8 to 10, Academic Press, 1977 and O. Olabisi, Polymer-Polymer Miscibility, 1979, pp. 117 to 189), but incompatible with the polystyrene-acrylonitrile produced during the polymerization. In this way, the amount of further polymer added regulates the rubber particle size and thus the properties of the ABS molding material produced. Electron photomicrographs after staining with $OsO_4$ and/or $RuO_4$ indicate novel rubber morphologies featuring a polymer included inside the rubber particles and itself surrounded by a thin rubber skin.

The polystyrene-acrylonitrile produced during the polymerization is grafted onto the polybutadiene part of the styrene-butadiene block rubber to a varying extent, depending on the reaction conditions, and thus results in binding to the polystyrene-acrylonitrile matrix. In this way, ABS products can be produced which utilize the advantages of solution or bulk polymerization and have a favorable combination of the product properties surface gloss, notched impact strength and rigidity.

Suitable monomers for carrying out the process are, in particular, styrene and acrylonitrile in a ratio of from 90:10 to 60:40. Other monomers, eg. α-methylstyrene, o-, m- or p-methylstyrene, tert-butylstyrene, methacrylonitrile or (meth)acrylates, may additionally be employed in a conventional manner.

The rubber used is at least one styrene-butadiene block copolymer. In general, two-block rubbers having a total styrene content of from 3 to 70% by weight, preferably from 10 to 50% by weight, and a block styrene content of from 2 to 60% by weight, preferably from 8 to 40% by weight, are employed. The weight average molecular weight of the block copolymers is from 20,000 to 600,000 g/mol. Examples of suitable commercially available products are Buna BL 6533, Buna BL 6426 and Buna BL 6578 from Bayer AG. The total rubber content, based on the polymer matrix, is from 2 to 30% by weight. An important embodiment comprises replacing some of the styrene-butadiene block copolymer by homopolybutadiene; in this case, the total butadiene content, based on the molding material, should be from 2 to 20% by weight and at least 20% of the rubber should be a block copolymer.

The polystyrenes employed are expediently products having a molecular weight (weight average) of from 10,000 to 10,000,000 g, preferably from 40,000 to 500,000 g. The polystyrene can have been obtained by free-radical or anionic polymerization and is used in an amount of from 0.1 to 30% by weight, preferably from 2 to 15% by weight, based on the polymer matrix.

The polycyclohexyl (meth)acrylate employed is a product having a molecular weight (weight average) of from 10,000 to 10,000,000 g, preferably from 40,000 to 500,000 g. The polycyclohexyl (meth)acrylate is generally polymerized by means of free radicals and is used in an amount of from 1 to 30% by weight, preferably from 2 to 15% by weight, based on the polymer matrix.

The polyphenylene ether employed is preferably poly-2,6-dimethyl-1,4-phenylene ether, but it is also possible to employ other polystyrene-compatible and polystyrene-acrylonitrile incompatible polyphenylene ethers and/or polyphenylene ether copolymers. Polyphenylene ethers of this type are obtained by oxidative coupling (cf. U.S. Pat. Nos. 3,661,848, 3,378,505, 3,306,874, 3,306,875 and 3,639,656). Suitable polyphenylene ethers generally have an intrinsic viscosity of from 0.1 to 2.0 dl/g, preferably from 0.3 to 0.7 dl/g, measured in chloroform at 25° C. The polyphenylene ether is likewise used according to the invention in an amount of from 1 to 30% by weight, based on the polymer matrix.

The solvents which can be used for the process according to the invention are either polar or nonpolar compounds or mixtures thereof. Preference is given to methyl ethyl ketone, cyclohexanone, toluene and, in particular, ethylbenzene. The solvents are employed in an amount of up to 30% by weight, based on the reaction mixture.

The polymerization can be carried out either thermally or by addition of free-radical initiators. Suitable free-radical initiators are graft-active peroxides. Particular preference is given to dibenzoyl peroxide, tert-butyl peroctanoate, tert-butyl perpivalate, tert-butyl perneodecanoate and bis(tert-butyl) peroxalate. The initiators are used in amounts of from 0 to 0.5% by weight, based on the monomers employed.

Suitable chain-transfer agents are the conventional mercaptans having from 14 to 18 carbon atoms. Particularly successful mercaptans are n-butyl mercaptan, n-octyl mercaptan and n- and t-dodecyl mercaptan. The amount of mercaptan, if used, is generally from 0.005 to 0.5% by weight, based on the monomers employed.

The polymerization according to the invention is carried out in at least two reaction zones. It is possible to utilize a reactor arrangement comprising one or two stirred reactors with two further polymerization towers arranged one after the other (cf. EP-A-0 054 131) or a reactor cascade having at least two polymerization towers arranged one after the other. However, it is also possible to use arrangements as described in BE 888 804.

Preference is given to a reactor cascade comprising four reaction zones, which are preferably stirred polymerization towers having internal cooling tubes.

The styrene-butadiene block rubber and the "further polymer" are dissolved in styrene and acrylonitrile and, if necessary, another solvent and fed continuously into the first reaction zone, where the polybutadiene part of the styrene-butadiene block rubber is grafted with polystyrene-acrylonitrile, while the phase inversion and the formation of the rubber particle morphology takes place in the second reaction zone. Grafting and phase inversion can also be carried out in a joint reaction zone. Reaction zones three and four, if present, are where the further polymerization of polystyrene-acrylonitrile matrix is carried out up to a solids content of at least 40% by weight, but preferably at least 65% by weight. After the final reaction zone, the polymer melt is degassed, cooled, extruded and granulated.

The continuous bulk or solution polymerization procedure may also be replaced by batchwise or semicontinuous processes.

Furthermore, use may also be made of the bulk-suspension polymerization process which was known hitherto, if the phase inversion is concluded before commencement of the suspension polymerization.

During the polymerization, in particular after preparation of the solution of the rubber and of the further polymer or before processing of the finished polymers, conventional additives, such as internal glidants and antioxidants or UV stabilizers, and lubricants, fillers and the like are added in conventional amounts.

In a particular embodiment of the invention, as stated, a conventional solution ABS is admixed with relatively large rubber particles.

Whereas the graft copolymers of the molding material according to the invention have a rubber particle size of from 0.1 to 3.0 μm, preferably from 0.2 to 1 μm, the added graft copolymer, whose polymer inclusions in the rubber particles have the same composition as the hard matrix, has a particle size of from 0.6 to 10 μm, preferably from 1 to 5 μm.

This embodiment helps meet the demand for also providing the ABS molding materials according to the invention, which as they are have particularly high general toughness, rigidity and surface gloss, with good low-temperature toughness.

In order to achieve this, the materials according to the invention are expediently mixed with a "conventional" ABS polymer in a ratio of from 50:50 to 95:5. Joint melting in the extruder gives a "bimodally distributed" ABS. The same effect is achieved if the materials are mixed immediately after their respective preparation (ie. before degassing) and then freed from solvent together.

The molding materials according to the invention are novel substances or substance mixtures which have a balanced ratio of surface gloss, notched impact strength and rigidity. A blend of ABS polymers having small and large particles (bimodal ABS) is no longer necessary to achieve favorable property combinations. A compounding step (which involves heating the polymer to in some cases up to 300° C.) is thus unnecessary. It thus follows that the process to be used according to the invention also has advantages.

The molding materials according to the invention thus have very good surface gloss, despite a relatively large rubber particle diameter, which is explained by the fact that the rubber particles are themselves well filled with a polymer ("the further polymer") and the rubber skin between the occlusions and the polystyrene-acrylonitrile matrix is very thin. As can be imagined, this has the consequence that the rubber particles at the surface of the finished part shrink less than conventional large particles and thus on cooling form only very small "pits", which hardly scatter the incident light at all. However, the above explanation is purely scientific and in no way restricts the invention.

The molding materials obtained by the process according to the invention can be processed by conventional methods of thermoplastics processing, eg. by extrusion, injection molding, calendering, blow molding, compression molding or sintering; the molding materials prepared by the process according to the invention are particularly preferably injected molded to give moldings.

The product properties listed in the examples and comparative experiments were determined as follows:

The mean particle size $d_{50}$ of the dispersed rubber particles by evaluating electron photomicrographs.

The notched impact strength in accordance with DIN 53 453 on moldings injection-molded at 230° C.

The modulus of elasticity, a measure of the rigidity, in accordance with DIN 53 457 on moldings injection-molded at 230° C.

The viscosity of the polystyrene-acrylonitrile matrix as a 0.5% strength by weight solution in dimethylformamide after separation from the rubber phase.

The heat distortion resistance (Vicat B) in accordance with DIN 53 460.

The surface gloss was measured in accordance with DIN 67 530 using a Dr. Lange laboratory reflectometer on the side faces of injection-molded test boxes, at a measurement angle of 55.8° (which differs from DIN 67 530) against a black standard. The test boxes have a length of 11 cm, a width of 4.3 cm and a height of 5 cm and weigh about 26-27 g. They were produced under the injection-molding conditions A or B given below on an Arburg Allround 370 CMD injection-molding machine.

Condition A:

| | |
|---|---|
| Material temperature | 255° C. |
| Mold-surface temperature | 60° C. |
| Injection time | 0.14 sec. |
| Injection pressure | 1200 bar |
| Back pressure | 100 bar |
| Condition B: | |
| Material temperature | 255° C. |
| Mold-surface temperature | 30° C. |
| Injection time | 0.4 sec. |
| Injection pressure | 1200 bar |
| Back pressure | 100 bar |

EXAMPLES 1 TO 16

Use of Polystyrene as the Further Polymer

Examples 1 to 4

In each case, 11.5 parts by weight (230 g) of the commercially available rubber Buna ® BL 6533 (Bayer AG) were dissolved overnight with various amounts of polystyrene (viscosity=74 ml/g) in a styrene/acrylonitrile mixture (75/25 parts by weight). Each of the solutions was heated to 80° C., and 0.04 part by weight of tert-butyl perpivalate was added, so that a polymer conversion of from about 10 to 12%/hour was achieved with the reaction temperature kept constant. At conversion of 20%, 0.2 part by weight of tert-dodecyl mercaptan was added to each experiment as molecular weight regulator, followed by 0.10 part by weight of a commercially available stabilizer (Irganox ® 1076 from Ciba-Geigy). The stirring speed using an anchor stirrer was set at 200 rpm in the 6 l steel autoclave. When a solids content of 40% had been reached, 0.1% dicumyl peroxide was added to the polymer, and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 1.

TABLE 1

| Example | Amount of polystyrene added [g] | Modulus of elasticity [N/mm²] | Notched impact strength 23° C. [kJ/m²] | Notched impact strength −40° C. [kJ/m²] | Surface gloss Cond. A [%] | Surface gloss Cond. B [%] | Rubber particle size $d_{50}$ [μm] |
|---|---|---|---|---|---|---|---|
| 1 | — | 2800 | 2.0 | 1.8 | 69 | 43 | 0.2 |
| 2 | 58 | 2770 | 3.2 | 2.5 | 68 | 44 | 0.3 |
| 3 | 116 | 2760 | 8.6 | 3.6 | 68 | 43 | 0.4 |
| 4 | 174 | 2760 | 7.1 | 3.4 | 67 | 41 | 0.8 |

Examples 5 to 8

In each case, 11.5 parts by weight (230 g) of Buna ® BL 6425 (Bayer AG) were dissolved overnight with various amounts of polystyrene (viscosity=74 ml/g) in a styrene/acrylonitrile mixture (75/25 parts by weight). Each of the solutions was heated to 80° C., and 0.04 part by weight of tert-butyl perpivalate was added, so that a polymer conversion of from about 10 to 12%/hour was achieved with the reaction temperature kept constant. At conversion of 20%, 0.2 part by weight of tert-dodecyl mercaptan was added to each experiment as molecular weight regulator, followed by 0.12 part by weight of Irganox ® 1076 as rubber stabilizer. The stirring speed using an anchor stirrer was set at 200 rpm in the 6 l steel autoclave. When a solids content of 40% had been reached, 0.1% dicumyl peroxide was added to the polymer, and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 3.

TABLE 3

| Example | Rubber added | Modulus of elasticity [N/mm$^2$] | Notched impact strength 23° C. [kJ/m$^2$] | Notched impact strength −40° C. [kJ/m$^2$] | Surface gloss Cond. A [%] | Surface gloss Cond. B [%] | Rubber particle size d$_{50}$ [μm] |
|---|---|---|---|---|---|---|---|
| 9 | Buna BL 6533 | 2650 | 10.2 | 4.5 | 65 | 40 | 0.7 |
| 10 | Buna BL 6425 | 2600 | 10.4 | 4.8 | 64 | 41 | 0.8 | with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced ar shown in Table 2.

Examples 11 and 12

In each case, 11.5 parts by weight (230 g) of block rubber (Example 11 Buna ® BL 6533; Example 12 Buna BL 6425 from Bayer AG) were dissolved overnight with in each case 116 g of polystyrene (viscosity =74 ml/g) in 1236 g of styrene and 412 g of acrylonitrile. 4.0 g of tert-dodecyl mercaptan and 2.0 g of Irganox 1076 were added to the solution. The reaction mixture was then polymerized thermally at 118° C. with stirring (200 rpm) until a solids content of 40% had been reached. 0.1% dicumyl peroxide was then added to the

TABLE 2

| Example | Amount of polystyrene added [g] | Modulus of elasticity [N/mm$^2$] | Notched impact strength 23° C. [kJ/m$^2$] | Notched impact strength −40° C. [kJ/m$^2$] | Surface gloss Cond. A [%] | Surface gloss Cond. B [%] | Rubber particle size d$_{50}$ [μm] |
|---|---|---|---|---|---|---|---|
| 5 | — | 2800 | 2.7 | 1.7 | 68 | 43 | 0.2 |
| 6 | 58 | 2750 | 3.3 | 2.5 | 70 | 42 | 0.3 |
| 7 | 116 | 2770 | 9.0 | 3.6 | 69 | 43 | 0.4 |
| 8 | 174 | 2780 | 7.3 | 3.0 | 68 | 43 | 0.7 |

Examples 9 and 10

In each case, 11.5 parts by weight (230 g) of block rubber (Example 9 Buna ® BL 6533; Example 10 Buna BL 6425 from Bayer AG) were dissolved overnight with in each case 116 g of polystyrene (viscosity=74 ml/g) in 1236 g of styrene and 412 g of acrylonitrile. 4.0 g of tert-dodecyl mercaptan and 2.0 g of Irganox 1076 were added to the solution. The reaction mixture was heated to 80° C., and 1.34 g of tert-butyl perpivalate were added, so that a polymer conversion of about 12%/hour was achieved with the reaction temperature kept constant. The stirring speed using an anchor stirrer was set at 200 rpm in the 6 l steel autoclave. After a solids content of 40% had been reached, 0.1% dicumyl peroxide was added to the polymer syrup, and the mixture was dispersed in an aqueous solution of 1.8 g of sodium phosphate, 18 g of an ethylene oxide-based suspension aid (Luviskol ® K 90 from BASF AG) and 50 polymer syrup, and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 4.

TABLE 4

| Example | Rubber added | Modulus of elasticity [N/mm$^2$] | Notched impact strength 23° C. [kJ/m$^2$] | Notched impact strength −40° C. [kJ/m$^2$] | Surface gloss Cond. A [%] | Surface gloss Cond. B [%] | Rubber particle size d$_{50}$ [μm] |
|---|---|---|---|---|---|---|---|
| 10 | Buna BL 6533 | 2600 | 9.8 | 3.9 | 65 | 40 | 0.8 |
| 11 | Buna BL 6425 | 2600 | 9.6 | 3.7 | 64 | 41 | 0.9 |

Examples 13 to 16

The examples below describe the continuous polymerization in a 4-tower cascade.

The polymerization plant comprises a 250 l rubber tank, a 250 l storage tank and four series-connected tower reactors (l/d = 1100/220 mm) with internal, horizontal, parallel layers of cooling tubes and a stirrer reaching between the cooling tube layers and a degassing and granulation unit downstream of the polymerization towers.

The following four rubber solutions were prepared for the polymerization:

| Example | | 13 | 14 | 15 | 16 |
|---|---|---|---|---|---|
| Buna BL 6533 | [parts by wt.] | 11.05 | 11.05 | 11.05 | 11.05 |
|  | [kg] | 27.63 | 27.63 | 27.63 | 27.63 |
| Polystyrene | [parts by wt.] | — | 3.0 | 5.0 | 7.0 |
| (viscosity = 74 ml/g) | [kg] | — | 7.5 | 12.5 | 17.5 |
| Irganox 1076 | [parts by wt.] | 0.1 | 0.1 | 0.1 | 0.1 |
|  | [kg] | 0.25 | 0.25 | 0.25 | 0.25 |
| Ethylbenzene | [parts by wt.] | 15.0 | 15.0 | 15.0 | 15.0 |
|  | [kg] | 37.5 | 37.5 | 37.5 | 37.5 |
| Styrene | [parts by wt.] | 55.39 | 53.14 | 51.64 | 50.14 |
|  | [kg] | 138.48 | 132.85 | 129.1 | 125.35 |
| Acrylonitrile | [parts by wt.] | 18.46 | 17.71 | 17.21 | 16.71 |
|  | [kg] | 46.15 | 44.27 | 43.02 | 41.77 |

The finished rubber solution is pumped into the storage tank, from where the polymerization plant is supplied continuously with 20 l/h of rubber solution.

In the first two polymerization towers, the polymerization is initiated at 80° C. by continuously adding tert-butyl perpivalate. The following amounts of tert-butyl perpivalate are required:

| Example | | 13 | 14 | 15 | 16 |
|---|---|---|---|---|---|
| tert-Butyl perpivalate for | | | | | |
| Tower 1 | [g/h] | 1.35 | 0.75 | 0.9 | 0.85 |
| Tower 2 | [g/h] | 3.15 | 3.60 | 3.75 | 3.90 |

The regulator (tert-dodecyl mercaptan) is likewise metered continuously into the four polymerization towers:

| Example | | 13 | 14 | 15 | 16 |
|---|---|---|---|---|---|
| tert-Dodecyl mercaptan for | | | | | |
| Tower 1 | | — | — | — | — |
| Tower 2 | [g/h] | 16 | 16 | 16 | 16 |
| Tower 3 | [g/h] | 50 | 50 | 50 | 50 |
| Tower 4 | [g/h] | — | — | — | — |

The polymerization was continued in the polymerization towers to the following solids contents:

| Example | | 13 | 14 | 15 | 16 |
|---|---|---|---|---|---|
| Solids content in | | | | | |
| Tower 1 | [% by wt.] | 15 | 18 | 19 | 20.5 |
| Tower 2 | [% by wt.] | 25 | 28 | 30 | 31 |
| Tower 3 | [% by wt.] | 45 | 45 | 45 | 45 |
| Tower 4 | [% by wt.] | 65 | 65 | 65 | 65 |

The stirring speed was 150 rpm in the first tower, 100 rpm in the second, 50 rpm in the third and 10 rpm in the fourth (rpm = revolutions per minute). The polymerization in the third and fourth tower reactors was carried out thermally at 130° and 146° C. respectively. After the fourth polymerization tower, the polymer melt was degassed, cooled and granulated. The throughput of ABS molding material was from 11 to 12 kg/h. Product properties of the solution ABS produced are shown in Table 5.

TABLE 5

| Example | | 13 | 14 | 15 | 16 |
|---|---|---|---|---|---|
| Modulus of elasticity | [N/mm$^2$] | 2620 | 2650 | 2580 | 2600 |
| Notched impact strength | | | | | |
| at 23° C. | [kJ/m$^2$] | 3.9 | 10.8 | 14.7 | 17.9 |
| at −40° C. | [kJ/m$^2$] | 2.7 | 4.5 | 4.7 | 5.6 |
| Surface gloss | | | | | |
| Condition A | [%] | 70 | 68 | 69 | 68 |
| Condition B | [%] | 46 | 44 | 44 | 43 |
| Rubber particle size d$_{50}$ | [μm] | 0.4 | 0.4 | 0.4 | 0.4 |
| Yellowness index | | 9.6 | 9.8 | 9.5 | 9.4 |
| Viscosity of the PSAN matrix | [ml/g] | 75.6 | 76.2 | 77.3 | 79.4 |

Comparative Experiment 1

For comparison, the properties of an ABS containing 17% by weight of polybutadiene and prepared by emulsion polymerization are used.

A polybutadiene latex is prepared by polymerizing 62 parts of butadiene in the presence of a solution of 0.6 part of tert-dodecyl mercaptan, 0.7 part of sodium C$_{14}$-alkylsulfonate as emulsifier, 0.2 part of potassium peroxodisulfate and 0.2 part of sodium pyrophosphate in 80 parts of water at 25° C. When the reaction is complete, the polymerization autoclave is decompressed. The conversion is 99%. A polybutadiene latex is obtained whose mean rubber particle size is 0.1 μm. The latex obtained is agglomerated by adding 25 parts of an emulsion, a copolymer of 96 parts of ethyl acrylate and 4 parts of methacrylamide having a solids content of 10 parts by weight, giving a polybutadiene latex having a mean particle size of 0.3 μm. 40 parts of water, 0.4 part of sodium C$_{14}$-alkylsulfonate and 0.2 part of potassium peroxodisulfate are added, and 38 parts of a mixture of styrene and acrylonitrile in a ratio of 70:30 are fed in in the course of 4 hours.

The polymerization is carried out at 75° C. with stirring. The conversion, based on styrene-acrylonitrile, is virtually quantitative. The graft rubber dispersion obtained is precipitated by means of calcium chloride solution, and the graft copolymer is separated off and washed with distilled water. The moist graft rubber is blended with polystyrene-acrylonitrile (viscosity 80.7 ml/g; AN content = 25% by weight) in a two-screw extruder with degassing so that the resultant ABS product contains 17% by weight of polybutadiene. The product properties are as follows:

TABLE 6

| Modulus of elasticity | [N/mm$^2$] | 2650 |
|---|---|---|
| Notched impact strength | | |
| at 23° C. | [kJ/m$^2$] | 11.0 |
| at −40° C. | [kJ/m$^2$] | 4.0 |
| Surface gloss | | |
| Condition A | [%] | 68.0 |
| Condition B | [%] | 47.0 |

TABLE 6-continued

| Rubber particle size d50 | [μm] | 0.3 |
| --- | --- | --- |
| Yellowness index | | 32.8 |
| Viscosity of the PSAN matrix | [ml/g] | 80.7 |

Comparative Experiment 2

The solution ABS with small particles (particle diameter ≦ 0.5 μm) was prepared as follows:

The polymerization plant comprises a 250 l rubber dissolution tank, a 250 l storage tank and four series-connected 30 l tower reactors (l/d=1100/220 mm) with internal, horizontal, parallel layers of cooling tubes and a stirrer engaging between the cooling tube layers, and a degassing and granulation unit downstream of the polymerization towers.

18 g of rubber (Buna HX 500 from Bayer AG having a solution viscosity of 90 mPa s as a 5% strength solution in styrene at 25° C.) are dissolved in 22.5 kg of ethylbenzene, 82.1 kg of styrene and 27.4 kg of acrylonitrile with stirring over the course of 5 hours. The finished rubber solution is pumped into the storage tank, from where the polymerization plant is supplied continuously with rubber solution. 20 l/h of rubber solution are pumped into the polymerization plant. In the first two polymerization towers, the polymerization is initiated at 80° C. by continuously adding tert-butyl perpivalate.

The polymerization is continued in the first tower to a solids content of 18% by weight, and in the second tower to a solids content of 28% by weight. To this end, 2.1 g/h of tert-butyl perpivalate are added to the first tower and 4.2 g/h to the second. The stirrer speed in both the polymerization towers is 150 rpm.

In the next two reaction towers, the PSAN matrix is formed by thermal polymerization. In the third polymerization tower, a solids content of 45% by weight is produced at 130° C. and a stirrer speed of 50 rpm. In the fourth polymerization tower, a solids content of 70% by weight is obtained by polymerization at 146° C. with stirring at 10 rpm.

All four polymerization towers are operated at capacity. Tert-dodecyl mercaptan as molecular weight regulator is metered into the second and third polymerization towers in an amount of 34 g/h in each case.

After the fourth polymerization tower, the polymer melt is degassed, cooled and granulated. The throughput of ABS molding material is 14 kg/h.

The product properties of the resultant solution ABS with small particles are as follows:

TABLE 7

| Modulus of elasticity | [N/mm²] | 2200 |
| --- | --- | --- |
| Notched impact strength | | |
| at 23° C. | [kJ/m²] | 6.0 |
| at −40° C. | [kJ/m²] | 5.0 |

TABLE 7-continued

| Surface gloss | | |
| --- | --- | --- |
| Condition A | [%] | 68.0 |
| Condition B | [%] | 42.0 |
| Rubber particle size d50 | [μm] | 0.35 |
| Yellowness index | | 11.8 |
| Viscosity of the PSAN matrix | [ml/g] | 77.0 |

Examples 17 to 30

Use of Polycyclohexyl (Meth)Acrylate as the Further Polymer

Examples 17 to 20

In each case, 11.5 parts by weight (230 g) of Buna ® BL 6533, (Bayer AG) were dissolved overnight with various amounts of polycyclohexyl (meth)acrylate (viscosity=56 ml/g) in a styrene/acrylonitrile mixture (75/25 parts by weight). Each of the solutions was heated to 80° C., and 0.04 part by weight of tert-butyl perpivalate was added, so that a polymer conversion of from about 10 to 12%/hour was achieved with the reaction temperature kept constant. At conversion of 20%, 0.2 part by weight of tert-dodecyl mercaptan was added to each experiment as molecular weight regulator, followed by 0.12 part by weight of Irganox ® 1076 as rubber stabilizer. The stirring speed using an anchor stirrer was set at 200 rpm in the 6 l steel autoclave. When a solids content of 40% had been reached, 0.1% dicumyl peroxide was added to the polymer,. and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 8.

TABLE 8

| Example | Amount of polycyclohexyl(meth)-acrylate [g] | Modulus of elasticity [N/mm²] | Notched impact strength 23° C. [kJ/m²] | Notched impact strength −40° C. [kJ/m²] | Surface gloss Cond. A [%] | Surface gloss Cond. B [%] | Rubber particle size d50 [μm] |
| --- | --- | --- | --- | --- | --- | --- | --- |
| 17 | — | 2800 | 2.0 | 1.8 | 69 | 43 | 0.2 |
| 18 | 58 | 2770 | 2.4 | 1.8 | 68 | 43 | 0.3 |
| 19 | 116 | 2740 | 2.9 | 1.9 | 68 | 43 | 0.3 |
| 20 | 174 | 2680 | 8.6 | 2.9 | 67 | 41 | 0.4 |

Examples 21 to 24

In each case, 11.5 parts by weight (230 g) of Buna ® BL 6425 (Bayer AG) were dissolved overnight with various amounts of polycyclohexyl (meth)acrylate (viscosity=55 ml/g) in a styrene/acrylonitrile mixture (75/25 parts by weight). Each of the solutions was heated to 80° C., and 0.04 part by weight of tert-butyl perpivalate was added, so that a polymer conversion of from about 10 to 12%/hour was achieved with the reaction temperature kept constant. At conversion of 20%, 0.2 part by weight of tert-dodecyl mercaptan was added to each experiment as molecular weight regulator, followed by 0.12 part by weight of Irganox ® 1076 as rubber stabilizer. The stirring speed using an anchor stirrer was set at 200 rpm in the 6 l steel autoclave. When a solids content of 40% had been reached, 0.1% dicumyl peroxide was added to the polymer, and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 10.

TABLE 10

| Example | Rubber added | Modulus of elasticity [N/mm$^2$] | Notched impact strength 23° C. [kJ/m$^2$] | Notched impact strength −40° C. [kJ/m$^2$] | Surface gloss Cond. A [%] | Surface gloss Cond. B [%] | Rubber particle size d$_{50}$ [μm] |
|---|---|---|---|---|---|---|---|
| 25 | Buna BL 6533 | 2760 | 3.5 | 1.9 | 69 | 42 | 0.3 |
| 26 | Buna BL 6425 | 2740 | 3.7 | 2.1 | 67 | 43 | 0.3 |

Examples 27 to 30

The examples below describe the continuous polymerization in a 4-tower cascade.

The polymerization plant comprises a 250 l rubber tank, a 250 l storage tank and four series-connected tower reactors (l/d=1100/220 mm) with internal, horizontal, parallel layers of cooling tubes and a stirrer reaching between the cooling tube layers and a degassing and granulation unit downstream of the polymerization towers.

The following four rubber solutions were prepared for the polymerization:

TABLE 11

| Example | 27 | 28 | 29 | 30 |
|---|---|---|---|---|

TABLE 9

| Example | Amount of polycyclohexyl(meth)-acrylate [g] | Modulus of elasticity [N/mm$^2$] | Notched impact strength 23° C. [kJ/m$^2$] | Notched impact strength −40° C. [kJ/m$^2$] | Surface gloss Cond. A [%] | Surface gloss Cond. B [%] | Rubber particle size d$_{50}$ [μm] |
|---|---|---|---|---|---|---|---|
| 21 | — | 2800 | 2.7 | 1.7 | 68 | 43 | 0.2 |
| 22 | 58 | 2720 | 2.0 | 1.8 | 69 | 42 | 0.3 |
| 23 | 116 | 2750 | 3.1 | 2.1 | 67 | 42 | 0.3 |
| 24 | 174 | 2670 | 7.8 | 2.7 | 67 | 42 | 0.4 |

Examples 25 and 26

In each case, 11.5 parts by weight (230 g) of block rubber (Example 25 Buna ® BL 6533; Example 26 Buna BL 6425 from Bayer AG) were dissolved overnight with in each case 116 g of polycyclohexyl (meth-)acrylate (viscosity=55 ml/g) in 1236 g of styrene and 412 g of acrylonitrile. 4.0 g of tert-dodecyl mercaptan and 2.0 g of Irganox 1076 were added to the solution. The reaction mixture was heated to 80° C., and 1.34 g of tert-butyl perpivalate were added, so that a polymer conversion of about 12%/hour was achieved with the reaction temperature kept constant. The stirring speed using an anchor stirrer was set at 200 rpm in the 6 l steel autoclave. After a solids content of 40% had been reached, 0.1% dicumyl peroxide was added to the polymer syrup, and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

| | | 27 | 28 | 29 | 30 |
|---|---|---|---|---|---|
| Buna BL 6533 | [parts by wt.] | 11.05 | 11.05 | 11.05 | 11.05 |
| | [kg] | 27.63 | 27.63 | 27.63 | 27.63 |
| Polycyclohexyl(meth)-acrylate (viscosity = 55 ml/g) | [parts by wt.] | — | 3.0 | 5.0 | 7.0 |
| | [kg] | — | 7.5 | 12.5 | 17.5 |
| Irganox 1076 | [parts by wt.] | 0.1 | 0.1 | 0.1 | 0.1 |
| | [kg] | 0.25 | 0.25 | 0.25 | 0.25 |
| Ethylbenzene | [parts by wt.] | 15.0 | 15.0 | 15.0 | 15.0 |
| | [kg] | 37.5 | 37.5 | 37.5 | 37.5 |
| Styrene | [parts by wt.] | 55.39 | 53.14 | 51.64 | 50.14 |
| | [kg] | 138.48 | 132.85 | 129.1 | 125.35 |
| Acrylonitrile | [parts by wt.] | 18.46 | 17.71 | 17.21 | 16.71 |
| | [kg] | 46.15 | 44.27 | 43.02 | 41.77 |

The finished rubber solution is pumped into the storage tank, from where the polymerization plant is supplied continuously with 20 l/h of rubber solution.

In the first two polymerization towers, the polymerization is initiated at 80° C. by continuously adding tert-butyl perpivalate. The following amounts of tert-butyl perpivalate are required:

TABLE 12

| tert-Butyl perpivalate for | Example 27 | 28 | 29 | 30 |
|---|---|---|---|---|
| Tower 1 [g/h] | 1.35 | 0.75 | 0.9 | 0.85 |
| Tower 2 [g/h] | 3.15 | 3.60 | 3.75 | 3.90 |

The regulator (tert-dodecyl mercaptan) is likewise metered continuously into the four polymerization towers:

TABLE 13

| tert-Dodecyl mercaptan for | Example | | | |
|---|---|---|---|---|
| | 27 | 28 | 29 | 30 |
| Tower 1 | — | — | — | — |
| Tower 2 [g/h] | 16 | 16 | 16 | 16 |
| Tower 3 [g/h] | 50 | 50 | 50 | 50 |
| Tower 4 [g/h] | — | — | — | — |

The polymerization was continued in the polymerization towers to the following solids contents:

TABLE 14

| Solids content in | Example | | | |
|---|---|---|---|---|
| | 27 | 28 | 29 | 30 |
| Tower 1 [% by wt.] | 15 | 18 | 19 | 20.5 |
| Tower 2 [% by wt.] | 25 | 28 | 30 | 31 |
| Tower 3 [% by wt.] | 45 | 45 | 45 | 45 |
| Tower 4 [% by wt.] | 65 | 65 | 65 | 65 |

The stirring speed was 150 rpm in the first tower, 100 rpm in the second, 50 rpm in the third and 10 rpm in the fourth (rpm=revolutions per minute). The polymerization in the third and fourth tower reactors was carried out thermally at 130° and 146° C. respectively. After the fourth polymerization tower, the polymer melt was degassed, cooled and granulated. The throughput of ABS molding material was from 11 to 12 kg/h. Product properties of the solution ABS produced are shown in Table 15.

TABLE 15

| Example | 27 | 28 | 29 | 3 |
|---|---|---|---|---|
| Modulus of elasticity [N/mm$^2$] | 2620 | 2600 | 2550 | 2600 |
| Notched impact strength | | | | |
| at 23° C. [kJ/m$^2$] | 3.9 | 6.4 | 8.3 | 9.8 |
| at −40° C. [kJ/m$^2$] | 2.7 | 3.2 | 3.4 | 4.5 |
| Surface gloss | | | | |
| Condition A [%] | 70 | 70 | 69 | 68 |
| Condition B [%] | 46 | 44 | 43 | 43 |
| Rubber particle size d$_{50}$ [μm] | 0.4 | 0.4 | 0.4 | 0.4 |
| Yellowness index | 9.6 | 8.2 | 9.3 | 9.7 |
| Viscosity of the PSAN matrix [ml/g] | 75.6 | 76.1 | 77.1 | 78.4 |

Examples 31 to 42

Use of Mixtures of Polystyrene and Polycyclohexyl (Meth)Acrylate as the Further Polymer Examples 31 to 36

In each case, 11.5 parts by weight (230 g) of Buna ® BL 6533 (Bayer AG; 40% by weight of bonded polystyrene, 30% by weight of block polystyrene) were dissolved overnight with various amounts of polystyrene (viscosity=74 ml/g) and polycyclohexyl (meth)acrylate (viscosity=55 ml/g) in a styrene/acrylonitrile mixture (75/25 parts by weight). Each of the solutions was heated to 80° C., and 0.04 part by weight of tert-butyl perpivalate was added, so that a polymer conversion of from about 10 to 12%/hour was achieved with the reaction temperature kept constant. At conversion of 20%, 0.2 part by weight of tert-dodecyl mercaptan was added to each experiment as molecular weight regulator, followed by 0.12 part by weight of Irganox ® 1076 as rubber stabilizer. The stirring speed using an anchor stirrer was set at 200 rpm in the 6 l steel autoclave. When a solids content of 40% had been reached, 0.1% dicumyl peroxide was added to the polymer, and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 16.

TABLE 16

| Ex. | Amount of polystyrene added [g] | Amount of polycyclohexyl(meth)-acrylate [g] | Modulus of elasticity [N/mm$^2$] | Notched impact strength | | Surface gloss | | Rubber particle size d$_{50}$ [μm] |
|---|---|---|---|---|---|---|---|---|
| | | | | 23° C. [kJ/m$^2$] | −40° C. [kJ/m$^2$] | Cond. A [%] | Cond. B [%] | |
| 31 | — | — | 2800 | 2.0 | 1.8 | 69 | 43 | 0.2 |
| 32 | 116 | — | 2760 | 8.6 | 3.6 | 68 | 43 | 0.4 |
| 33 | — | 116 | 2750 | 2.9 | 1.9 | 68 | 43 | 0.3 |
| 34 | 29 | 87 | 2700 | 3.4 | 1.9 | 68 | 44 | 0.4 |
| 35 | 58 | 58 | 2720 | 4.9 | 2.8 | 68 | 43 | 0.4 |
| 36 | 87 | 29 | 2750 | 6.8 | 3.4 | 68 | 44 | 0.4 |

Examples 37 to 42

The examples below describe the continuous polymerization in a 4-tower cascade.

The polymerization plant comprises a 250 l rubber tank, a 250 l storage tank and four series-connected tower reactors (l/d=1100/220 mm) with internal, horizontal, parallel layers of cooling tubes and a stirrer reaching between the cooling tube layers and a degassing and granulation unit downstream of the polymerization towers.

The following six rubber solutions were prepared for the polymerization:

TABLE 17

| Example | 37 | 38 | 39 | 40 | 41 | 42 |
|---|---|---|---|---|---|---|
| Buna BL 6533 | | | | | | |
| [parts by wt.] | 11.05 | 11.05 | 11.05 | 11.05 | 11.05 | 11.05 |
| [kg] | 27.63 | 27.63 | 27.63 | 27.63 | 27.63 | 27.63 |
| Polystyrene (vicosity = 74 ml/g) | | | | | | |
| [parts by wt.] | 5.0 | — | 1.0 | 2.0 | 3.0 | 4.0 |
| [kg] | 12.5 | — | 2.5 | 5.0 | 7.5 | 10.0 |
| Polycyclohexyl(meth)-acrylate (viscosity = 55 ml/g) | | | | | | |
| [parts by wt.] | — | 5.0 | 4.0 | 3.0 | 2.0 | 1.0 |
| [kg] | — | 12.5 | 10.0 | 7.5 | 5.0 | 2.5 |
| Irganox 1076 | | | | | | |
| [parts by wt.] | 0.1 | 0.1 | 0.1 | 0.1 | 0.1 | 0.1 |
| [kg] | 0.25 | 0.25 | 0.25 | 0.25 | 0.25 | 0.25 |
| Ethylbenzene | | | | | | |
| [parts by wt.] | 15 | 15 | 15 | 15 | 15 | 15 |
| [kg] | 37.5 | 37.5 | 37.5 | 37.5 | 37.5 | 37.5 |
| Styrene | | | | | | |
| [parts by wt.] | 51.64 | 51.64 | 51.64 | 51.64 | 51.64 | 51.64 |
| [kg] | 129.1 | 129.1 | 129.1 | 129.1 | 129.1 | 129.1 |
| Acrylonitrile | | | | | | |
| [parts by wt.] | 17.21 | 17.21 | 17.21 | 17.21 | 17.21 | 17.21 |
| [kg] | 43.0 | 43.0 | 43.0 | 43.0 | 43.0 | 43.0 |

The finished rubber solution is pumped into the storage tank, from where the polymerization plant is supplied continuously with 20 l/h of rubber solution.

In the first two polymerization towers, the polymerization is initiated at 80° C. by continuously adding tert-butyl perpivalate. The following amounts of tert-butyl perpivalate are required:
  0.9 g/h for tower 1
  3.8 g/h for tower 2

The regulator (tert-dodecyl mercaptan) is likewise metered continuously into the four polymerization towers:
  16 g/h in tower 2
  50 g/h in tower 3

The polymerization was continued in the polymerization towers to the following solids contents:
  19% by weight in tower 1
  30% by weight in tower 2
  45% by weight in tower 3
  65% by weight in tower 4

The stirring speed was 150 rpm in the first tower, 100 rpm in the second, 50 rpm in the third and 10 rpm in the fourth (rpm = revolutions per minute). The polymerization in the third and fourth tower reactors was carried out thermally at 130° and 146° C. respectively. After the fourth polymerization tower, the polymer melt was degassed, cooled and granulated. The throughput of ABS molding material was from 11 to 12 kg/h. Product properties of the solution ABS produced are shown in Table 18.

TABLE 18

| Example | 37 | 38 | 39 | 40 | 41 | 42 |
|---|---|---|---|---|---|---|
| Modulus of elasticity [N/mm$^2$] | 2580 | 2550 | 2550 | 2500 | 2540 | 2550 |
| Notched impact strength | | | | | | |
| at 23° C. [kJ/m$^2$] | 14.7 | 8.3 | 9.1 | 9.3 | 10.4 | 12.1 |
| at −40° C. [kJ/m$^2$] | 4.7 | 3.4 | 3.4 | 3.6 | 4.1 | 4.3 |
| Surface gloss | | | | | | |
| Condition A [%] | 69 | 69 | 69 | 69 | 68 | 68 |
| Condition B [%] | 44 | 43 | 43 | 44 | 44 | 44 |
| Rubber particle size d$_{50}$ [ρm] | 0.4 | 0.4 | 0.4 | 0.4 | 0.4 | 0.4 |
| Yellowness indeax | 9.5 | 9.3 | 9.3 | 9.6 | 9.3 | 9.2 |
| Viscosity of the PSAN matrix [ml/g] | 77.3 | 77.1 | 78.5 | 77.9 | 78.2 | 77.9 |

EXAMPLES 43 TO 58

Use of Polyphenylene Ether as the Further Polymer

Examples 43 to 46

In each case, 11.5 parts by weight (230 g) of Buna ® BL 6533 (Bayer AG) were dissolved overnight with various amounts of poly-2,6-dimethyl-1,4-phenylene ether ( intrinsic viscosity 0.53 dl/g) in a styrene/acrylonitrile mixture (75/25 parts by weight). Each of the solutions was heated to 80° C., and 0.04 part by weight of tert-butyl perpivalate was added, so that a polymer conversion of from about 10 to 12%/hour was achieved with the reaction temperature kept constant. At conversion of 20%, 0.2 part by weight of tert-dodecyl mercaptan was added to each experiment as molecular weight regulator, followed by 0.12 part by weight of Irganox ® 1076 as rubber stabilizer. The stirring speed using an anchor stirrer was set at 200 rpm in the 6 l steel autoclave. When a solids content of 40% had been reached, 0.1% dicumyl peroxide was added to the polymer, and the mixture was dispersed in an aqueous solution of 1.8 g of sodium phosphate, 18 g of an ethylene oxidebased suspension aid (Luviskol ® K 90 from BASF AG) and 50 g of Ertivinol in 1800 g of water with stirring (300 rpm). Complete conversion was ensured by polymerizing using the temperature program below:
3 hours at 110° C.
3 hours at 130° C.
4 hours at 140° C.
The bead polymer obtained was washed thoroughly with distilled water and dried overnight at 80° C. under reduced pressure.

The characterisation was carried out on moldings produced from the dried bead polymer. Properties of the ABS products produced are shown in Table 20.

TABLE 20

| Ex. | Amount of polyphenylene ether added [g] | Modulus of elasticity [N/mm$^2$] | Vicat B [°C.] | Notched impact strength 23° C. [kJ/m$^2$] | −40° C. [kJ/m$^2$] | Surface gloss Cond. A [%] | Cond. B [%] | Rubber particle size d$_{50}$ [μm] |
|---|---|---|---|---|---|---|---|---|
| 47 | — | 2800 | 98.4 | 2.7 | 1.7 | 68 | 43 | 0.2 |
| 48 | 58 | 2850 | 99.3 | 3.1 | 2.2 | 68 | 42 | 0.3 |
| 49 | 116 | 2870 | 101.1 | 7.2 | 3.4 | 69 | 44 | 0.4 |
| 50 | 174 | 2900 | 101.9 | 7.8 | 4.3 | 67 | 41 | 0.4 | with distilled water and dried overnight at 80° C. under reduced pressure.

The characterization was carried out on moldings produced from the dried bead polymer. Properties of the ABS products produced are shown in Table 19.

TABLE 19

| Ex. | Amount of poly-2,6-dimethyl-1,4-phenylene ether added [g] | Modulus of elasticity [N/mm$^2$] | Vicat B [°C.] | Notched impact strength 23° C. [kJ/m$^2$] | −40° C. [kJ/m$^2$] | Surface gloss Cond. A [%] | Cond. B [%] | Rubber particle size d$_{50}$ [μm] |
|---|---|---|---|---|---|---|---|---|
| 43 | — | 2800 | 98.2 | 2.0 | 1.8 | 69 | 43 | 0.2 |
| 44 | 58 | 2850 | 99.3 | 3.0 | 1.9 | 68 | 43 | 0.3 |
| 45 | 116 | 2900 | 101.4 | 7.3 | 3.6 | 68 | 44 | 0.4 |
| 46 | 174 | 2900 | 102.3 | 8.0 | 4.2 | 67 | 42 | 0.4 |

Examples 47 to 50

In each case, 11.5 parts by weight (230 g) of Buna ® BL 6425 (Bayer AG) were dissolved overnight with various amounts of poly-2,6-dimethyl-1,4-phenylene ether (intrinsic viscosity 0.53 dl/g) in a styrene/acrylonitrile mixture (75/25 parts by weight). Each of the solutions was heated to 80° C., and 0.04 part by weight of tert-butyl perpivalate was added, so that a polymer conversion of from about 10 to 12%/hour was achieved with the reaction temperature kept constant. At conversion of 20%, 0.2 part by weight of tert-dodecyl mercaptan was added to each experiment as molecular weight regulator, followed by 0.12 part by weight of Irganox ® 1076 as rubber stabilizer. The stirring speed using an anchor stirrer was set at 200 rpm in the 6 l steel autoclave. When a solids content of 40% had been reached, 0.1% dicumyl peroxide was added to the polymer, and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:
3 hours at 110° C.
3 hours at 130° C.
4 hours at 140° C.

In each case, 11.5 parts by weight (230 g) of block rubber (Example 51 Buna ® BL 6533; Example 52 Buna BL 6425 from Bayer AG) were dissolved overnight with in each case 116 g of poly-2,6-dimethyl-1,4-phenylene ether (intrinsic viscosity 0.53 dl/g) in 1236 g of styrene and 412 g of acrylonitrile. 4.0 g of tert-dodecyl mercaptan and 2.0 g of Irganox 1076 were added to the solution. The reaction mixture was heated to 80° C., and 1.34 g of tert-butyl perpivalate were added, so that a polymer conversion of about 12%/hour was achieved with the reaction temperature kept constant. The stirring speed using an anchor stirrer was set at 200 rpm in the 6 l steel autoclave. After a solids content of 40% had been reached, 0.1% dicumyl peroxide was added to the polymer, and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:
3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 21.

TABLE 21

| Ex. | Rubber added | Modulus of elasticity [N/mm$^2$] | Vicat B [°C.] | Notched impact strength 23° C. [kJ/m$^2$] | −40° C. [kJ/m$^2$] | Surface gloss Cond. A [%] | Cond. B [%] | Rubber particle size d$_{50}$ [μm] |
|---|---|---|---|---|---|---|---|---|
| 51 | Buna BL 6533 | 2850 | 103.1 | 8.6 | 4.2 | 65 | 41 | 0.5 |
| 52 | Buna BL 6425 | 2790 | 102.0 | 8.3 | 4.0 | 63 | 42 | 0.5 |

Examples 53 and 54

In each case, 11.5 parts by weight (230 g) of block rubber (Example 53 Buna® BL 6533; Example 54 Buna BL 6425 from Bayer AG) were dissolved overnight with in each case 116 g of poly-2,6-dimethyl-1,4-phenylene ether (intrinsic viscosity 0.53 dl/g) in 1236 g of styrene and 412 g of acrylonitrile. 4.0 g of tert-dodecyl mercaptan and 2.0 g of Irganox 1076 were added to the solution. The reaction mixture was then polymerized thermally at 118° C. with stirring (200 rpm) until a solids content of 40% had been reached. 0.1% dicumyl peroxide was then added to the polymer syrup, and the mixture was dispersed in an aqueous solution of 1.8 g of sodium phosphate, 18 g of an ethylene oxide-based suspension aid (Luviskol® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 22.

TABLE 22

| Ex. | Rubber rubber | Modulus of elasticity [N/mm$^2$] | Vicat B [°C.] | Notched impact strength 23° C. [kJ/m$^2$] | Notched impact strength −40° C. [kJ/m$^2$] | Surface gloss Cond. A [%] | Surface gloss Cond. B [%] | Rubber particle size d$_{50}$ [μm] |
|---|---|---|---|---|---|---|---|---|
| 53 | Buna BL 6533 | 2850 | 100.7 | 7.9 | 3.7 | 66 | 41 | 0.5 |
| 52 | Buna BL 6425 | 2800 | 101.5 | 8.2 | 3.5 | 67 | 41 | 0.6 |

Examples 55 to 58

The examples below describe the continuous polymerization in a 4-tower cascade.

The polymerization plant comprises a 250 l rubber tank, a 250 l storage tank and four series-connected tower reactors (l/d=1100/220 mm) with internal, horizontal, parallel layers of cooling tubes and a stirrer reaching between the cooling tube layers and a degassing and granulation unit downstream of the polymerization towers.

The following four rubber solutions were prepared for the polymerization:

TABLE 23

| Example | | 55 | 56 | 57 | 58 |
|---|---|---|---|---|---|
| Buna BL 6533 | [parts by wt.] | 11.05 | 11.05 | 11.05 | 11.05 |
| | [kg] | 27.63 | 27.63 | 27.63 | 27.63 |
| Poly-2,6-di- | [parts by wt.] | — | 3.0 | 5.0 | 7.0 |
| methyl-1,4- phenylene ether (Intrinsic viscosity 0.53 dl/g) | [kg] | — | 7.5 | 12.5 | 17.5 |
| Irganox 1076 | [parts by wt.] | 0.1 | 0.1 | 0.1 | 0.1 |
| | [kg] | 0.25 | 0.25 | 0.25 | 0.25 |
| Ethylbenzene | [parts by wt.] | 15.0 | 15.0 | 15.0 | 15.0 |
| | [kg] | 37.5 | 37.5 | 37.5 | 37.5 |
| Styrene | [parts by wt.] | 55.39 | 53.14 | 51.64 | 50.14 |
| | [kg] | 138.40 | 132.85 | 129.1 | 125.35 |
| Acrylonitrile | [parts by wt.] | 18.45 | 17.71 | 17.21 | 16.71 |
| | [kg] | 46.15 | 44.27 | 43.02 | 41.77 |

The finished rubber solution is pumped into the storage tank, from where the polymerization plant is supplied continuously with 20 l/h of rubber solution.

In the first two polymerization towers, the polymerization is initiated at 80° C. by continuously adding tert-butyl perpivalate. The following amounts of tert-butyl perpivalate are required:

TABLE 24

| tert-Butyl perpivalate for | | Example 55 | 56 | 57 | 58 |
|---|---|---|---|---|---|
| Tower 1 | [g/h] | 1.4 | 0.9 | 1.1 | 0.9 |
| Tower 2 | [g/h] | 3.2 | 3.7 | 3.8 | 4.1 |

The regulator (tert-dodecyl mercaptan) is likewise metered continuously into the four polymerization towers:

TABLE 25

| tert-Dodecyl mercaptan for | | Example 55 | 56 | 57 | 58 |
|---|---|---|---|---|---|
| Tower 1 | | — | — | — | — |
| Tower 2 | [g/h] | 16 | 16 | 16 | 16 |
| Tower 3 | [g/h] | 50 | 50 | 50 | 50 |
| Tower 4 | [g/h] | — | — | — | — |

Examples 59 to 70

Use of Mixtures of Polystyrene and Polyphenylene Ether as the Further Polymer

Examples 59 to 64

In each case, 11.5 parts by weight (230 g) or Buna® BL 6533 (Bayer AG; 40% by weight of bonded polystyrene, 30% by weight of block polystyrene) were dissolved overnight with various amounts of polystyrene (viscosity=74 ml/g) and poly2,6-dimethyl-1,4-phenylene ether (intrinsic viscosity 0.53 dl/g) in a styrene/acrylonitrile mixture (75/25 parts by weight). Each of the solutions was heated to 80° C., and 0.04 part by weight of tert-butyl perpivalate was added, so that a polymer conversion of from about 10 to 12%/hour was achieved with the reaction temperature kept constant. At conversion of 20%, 0.2 part by weight of tert-dodecyl mercaptan was added to each experiment as molecular weight regulator, followed by 0.12 part by weight of Irganox® 1076 as rubber stabilizer. The stirring speed using an anchor stirrer was set at 200 rpm in the 6 l steel autoclave. When a solids content of 40% had been reached, 0.1% dicumyl peroxide was added to the polymer, and the mixture was dispersed in an aqueous solution of 1.8 g of sodium phosphate, 18 g of an ethylene oxide-based suspension aid (Luviskol® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 26.

TABLE 26

| Ex. | Amount of polystyrene added [g] | Amount of polyphenylene ether [g] | Modulus of elasticity [N/mm$^2$] | Notched impact strength 23° C. [kJ/m$^2$] | Notched impact strength −40° C. [kJ/m$^2$] | Surface gloss Cond. A [%] | Surface gloss Cond. B [%] | Rubber particle size d$_{50}$ [μm] |
|---|---|---|---|---|---|---|---|---|
| 59 | — | — | 2800 | 2.0 | 1.8 | 69 | 43 | 0.2 |
| 60 | 116 | — | 2760 | 8.6 | 3.6 | 68 | 43 | 0.4 |
| 61 | — | 116 | 2900 | 7.3 | 3.6 | 68 | 44 | 0.4 |
| 62 | 29 | 87 | 2800 | 7.4 | 3.7 | 67 | 42 | 0.4 |
| 63 | 58 | 58 | 2780 | 7.5 | 3.7 | 66 | 43 | 0.4 |
| 64 | 87 | 29 | 2780 | 8.0 | 3.6 | 68 | 44 | 0.4 |

Examples 65-70

The examples below describe the continuous polymerization in a 4-tower cascade.

The polymerization plant comprises a 250 l rubber tank, a 250 l storage tank and four series-connected tower reactors (l/d = 1100/220 mm) with internal, horizontal, parallel layers of cooling tubes and a stirrer reaching between the cooling tube layers and a degassing and granulation unit downstream of the polymerization towers.

The following six rubber solutions were prepared for the polymerization:

TABLE 27

| Example | | 65 | 66 | 67 | 68 | 69 | 70 |
|---|---|---|---|---|---|---|---|
| Buna BL 6533 | [parts by wt.] | 11.05 | 11.05 | 11.05 | 11.05 | 11.05 | 11.05 |
| | [kg] | 27.63 | 27.63 | 27.63 | 27.63 | 27.63 | 27.63 |
| Polystyrene (viscosity = 74 ml/g) | [parts by wt.] | 5.0 | — | 1.0 | 2.0 | 3.0 | 4.0 |
| | [kg] | 12.5 | — | 2.5 | 5.0 | 7.5 | 10.0 |
| Poly-2,6-dimethyl-1,4-phenylene ether (Intrinsic viscosity 0.53 dl/g) | [parts by wt.] | — | 5.0 | 4.0 | 3.0 | 2.0 | 1.0 |
| | [kg] | — | 12.5 | 10.0 | 7.5 | 5.0 | 2.5 |
| Irganox 1076 | [parts by wt.] | 0.1 | 0.1 | 0.1 | 0.1 | 0.1 | 0.1 |
| | [kg] | 0.25 | 0.25 | 0.25 | 0.25 | 0.25 | 0.25 |
| Ethylbenzene | [parts by wt.] | 15 | 15 | 15 | 15 | 15 | 15 |
| | [kg] | 37.5 | 37.5 | 37.5 | 37.5 | 37.5 | 37.5 |
| Styrene | [parts by wt.] | 51.64 | 51.64 | 51.64 | 51.64 | 51.64 | 51.64 |
| | [kg] | 129.1 | 129.1 | 129.1 | 129.1 | 129.1 | 129.1 |
| Acrylonitrile | [parts by wt.] | 17.21 | 17.21 | 17.21 | 17.21 | 17.21 | 17.21 |
| | [kg] | 43.0 | 43.0 | 43.0 | 43.0 | 43.0 | 43.0 |

The finished rubber solution is pumped into the storage tank, from where the polymerization plant is supplied continuously with 20 l/h of rubber solution.

In the first two polymerization towers, the polymerization is initiated at 80° C. by continuously adding tert-butyl perpivalate. The following amounts of tert-butyl perpivalate are required:

0.9 g/h for tower 1
3.8 g/h for tower 2

The regulator (tert-dodecyl mercaptan) is likewise metered continuously into the four polymerization towers:

16 g/h in tower 2
50 g/h in tower 3

The polymerization was continued in the polymerization towers to the following solids contents:

19% by weight in tower 1
30% by weight in tower 2
45% by weight in tower 3
65% by weight in tower 4

The stirring speed was 150 rpm in the first tower, 100 rpm in the second, 50 rpm in the third and 10 rpm in the fourth (rpm = revolutions per minute). The polymerization in the third and fourth tower reactors was carried out thermally at 130° and 146° C. respectively. After the fourth polymerization tower, the polymer melt was degassed, cooled and granulated. The throughput of ABS molding material was from 11 to 12 kg/h. Product properties of the solution ABS produced are shown in Table 28.

TABLE 28

| Example | 65 | 66 | 67 | 68 | 69 | 70 |
|---|---|---|---|---|---|---|
| Modulus of elasticity [N/mm$^2$] | 2580 | 2720 | 2700 | 2680 | 2650 | 2600 |
| Notched impact strength at 23° C. [kJ/m$^2$] | 14.7 | 10.0 | 10.5 | 10.7 | 11.3 | 12.1 |
| at −40° C. [kJ/m$^2$] | 4.7 | 3.9 | 3.9 | 4.0 | 4.0 | 4.1 |
| Surface gloss Condition A [%] | 69 | 67 | 67 | 68 | 68 | 68 |
| Condition B [%] | 44 | 42 | 41 | 42 | 42 | 42 |
| Rubber particle size d$_{50}$ [μm] | 0.4 | 0.5 | 0.5 | 0.5 | 0.5 | 0.5 |
| Yellowness index | 9.5 | 12.4 | 12.1 | 11.9 | 11.5 | 10.5 |

Examples 71 to 100

In each case, the amounts indicated in Table 29 of styrene-butadiene block copolymer Buna ® BL 6533, Bayer AG) together with the indicated amounts of polybutadiene (Buna HX 500, Bayer AG) and the polymers mentioned in the claims were dissolved overnight in 1648 g of a styrene-acrylonitrile mixture (75/25 parts by weight).

Each of the solutions was heated to 80° C., and 0.04 part by weight of tert-butyl perpivalate was added, so that a polymer conversion of from about 10 to 12%/hour was achieved with the reaction temperature kept constant. At conversion of 20%, 0.2 part by weight of tert-dodecyl mercaptan was added to each experiment as molecular weight regulator, followed by 0.12 part by weight of Irganox ® 1076 as rubber stabilizer. The stirring speed using an anchor stirrer was set at 200 rpm in the 6 l steel autoclave. When a solids content of 40% had been reached, 0.1% dicumyl peroxide was added to the polymer, and the mixture was dispersed in an aqueous solution of 1.8 g of sodium phosphate, 18 g of an ethylene oxide-based suspension aid (Luviskol ® K 90 from BASF AG) and 50 g of Ertivinol in 1800 g of water with stirring (300 rpm). Complete conversion was ensured by polymerizing using the temperature program below:

3 hours at 110° C.
3 hours at 130° C.
4 hours at 140° C.

The bead polymer obtained was washed thoroughly with distilled water and dried overnight at 80° C. under reduced pressure.

The characterization was carried out on moldings produced from the dried bead polymer. Properties of the ABS products produced are shown in Table 29.

TABLE 30

| Ex. | Buna BL 6533 [kg] | Buna HX 500 [g] | Polystyrene (visc.= 74 ml/g) [kg] | Polyphenylene ether (0.53 dl/g) [kg] | Polycyclohexyl (meth)acrylate (visc. = 55 ml/g) [kg] |
|---|---|---|---|---|---|
| 86 | 27.63 | — | 12.5 | — | — |
| 87 | 22.10 | 5.33 | 12.5 | — | — |
| 88 | 19.34 | 8.29 | 12.5 | — | — |
| 89 | 27.63 | — | — | 12.5 | — |
| 90 | 22.10 | 5.53 | — | 12.5 | — |
| 91 | 19.34 | 8.29 | — | 12.5 | — |
| 92 | 27.63 | — | — | — | 12.5 |
| 93 | 22.10 | 5.53 | — | — | 12.5 |
| 94 | 19.34 | 8.29 | — | — | 12.5 |
| 95 | 27.63 | — | 6.25 | 6.25 | — |
| 96 | 22.10 | 5.53 | 6.25 | 6.25 | — |
| 97 | 19.34 | 8.29 | 6.25 | 6.25 | — |
| 98 | 27.63 | — | 6.25 | — | 6.25 |
| 99 | 22.10 | 5.53 | 6.25 | — | 6.25 |
| 100 | 19.34 | 8.29 | 6.25 | — | 6.25 |

The finished rubber solution is pumped into the storage tank, from where the polymerization plant is supplied continuously with 20 l/h of rubber solution.

In the first two polymerization towers, the polymerization is initiated at 80° C. by continuously adding tert-butyl perpivalate. The following amounts of tertbutyl perpivalate are required:

0.9 g/h for tower 1
3.8 g/h for tower 2

The regulator (tert-dodecyl mercaptan) is likewise

TABLE 29

| Ex. | Buna BL 6533 [g] | Buna HX 500 [g] | Polystyrene (visc. = 74 ml/g) [g] | Polyphenylene ether (0.53 dl/g) [g] | Polycyclohexyl methacrylate (visc. = 55 ml/g) [g] | Modulus of elasticity [N/mm²] | Notched impact strength 23° C. [kJ/m²] | Notched impact strength −40° C. [kJ/m²] | Surface gloss Cond. A [%] | Surface gloss Cond. B [%] | Rubber particle size $d_{50}$ [μm] |
|---|---|---|---|---|---|---|---|---|---|---|---|
| 71 | 230 | — | 116 | — | — | 2760 | 8.6 | 3.6 | 68 | 43 | 0.4 |
| 72 | 184 | 46 | 116 | — | — | 2700 | 8.9 | 4.5 | 67 | 42 | 0.4 |
| 73 | 138 | 92 | 116 | — | — | 2600 | 10.5 | 6.8 | 67 | 40 | 0.5 |
| 74 | 230 | — | — | 116 | — | 2900 | 7.3 | 3.6 | 68 | 44 | 0.4 |
| 75 | 184 | 46 | — | 116 | — | 2800 | 7.5 | 4.5 | 68 | 43 | 0.4 |
| 76 | 138 | 92 | — | 116 | — | 2720 | 7.8 | 5.3 | 66 | 42 | 0.4 |
| 77 | 230 | — | — | — | 116 | 2750 | 2.9 | 1.9 | 68 | 43 | 0.3 |
| 78 | 184 | 46 | — | — | 116 | 2680 | 3.1 | 2.9 | 67 | 42 | 0.3 |
| 79 | 138 | 92 | — | — | 116 | 2640 | 4.0 | 3.6 | 68 | 41 | 0.4 |
| 80 | 230 | — | 58 | 58 | — | 2780 | 7.5 | 3.6 | 66 | 43 | 0.4 |
| 81 | 184 | 46 | 58 | 58 | — | 2750 | 7.8 | 4.2 | 67 | 42 | 0.4 |
| 82 | 138 | 92 | 58 | 58 | — | 2700 | 9.4 | 5.8 | 65 | 42 | 0.4 |
| 83 | 230 | — | 58 | — | 58 | 2720 | 4.9 | 2.8 | 68 | 43 | 0.4 |
| 84 | 184 | 46 | 58 | — | 58 | 2680 | 7.3 | 3.2 | 67 | 40 | 0.4 |
| 85 | 138 | 92 | 58 | — | 58 | 2620 | 8.2 | 4.8 | 66 | 41 | 0.4 |

Examples 86 to 100

The examples below describe the continuous polymerization in a 4-tower cascade.

The polymerization plant comprises a 250 l rubber tank, a 250 l storage tank and four series-connected tower reactors (l/d=1100/220 mm) with internal, horizontal, parallel layers of cooling tubes and a stirrer reaching between the cooling tube layers and a degassing and granulation unit downstream of the polymerization towers.

The following four rubber solutions were prepared for the polymerization:

0.25 kg of Irganox 1076 and the amounts indicated in Table 30 of various rubbers and polymers were dissolved with stirring in 129.1 kg styrene, 43.01 kg of acrylonitrile and 37.5 kg of ethylbenzene.

metered continuously into the four polymerization towers:

16 g/h in tower 1
- g/h in tower 2
50 g/h in tower 3
- g/h in tower 4

The polymerization was continued in the polymerization towers to the following solids contents:

19% by weight in tower 1
30% by weight in tower 2
45% by weight in tower 3
65% by weight in tower 4

The stirring speed was 150 rpm in the first tower, 100 rpm in the second, 50 rpm in the third and 10 rpm in the fourth (rpm=revolutions per minute). The polymerization in the third and fourth tower reactors was carried out thermally at 130° and 146° C. respectively. After the fourth polymerization tower, the polymer melt was degassed, cooled and granulated. The throughput of ABS molding material was from 11 to 12 kg/h. Product properties of the solution ABS produced are shown in Table 31.

| Styrene content of ths PSAN matrix | 75.0% by weight |
| Acrylonitrile content of the PSAN matrix | 25.0% by weight |

TABLE 31

| Ex. | Modulus of elasticity [N/mm$^2$] | Vicat B [°C.] | Notched impact strength 23° C. [kJ/m$^2$] | Notched impact strength −40° C. [kJ/m$^2$] | Surface gloss Cond. A [%] | Surface gloss Cond. B [%] | Yellowness Index | Rubber particle size d$_{50}$ [μm] |
|---|---|---|---|---|---|---|---|---|
| 86 | 2580 | 100.5 | 14.7 | 4.7 | 69 | 44 | 9.5 | 0.4 |
| 87 | 2520 | 100.3 | 14.9 | 6.2 | 68 | 43 | 9.8 | 0.4 |
| 88 | 2470 | 99.9 | 15.2 | 8.7 | 67 | 43 | 9.8 | 0.4 |
| 89 | 2720 | 102.1 | 10.0 | 3.9 | 67 | 42 | 12.4 | 0.5 |
| 90 | 2640 | 102.0 | 10.8 | 4.7 | 66 | 42 | 12.5 | 0.5 |
| 91 | 2620 | 101.4 | 10.9 | 5.3 | 66 | 42 | 12.7 | 0.5 |
| 92 | 2550 | 100.5 | 8.3 | 3.4 | 69 | 43 | 9.3 | 0.4 |
| 93 | 2500 | 100.2 | 8.8 | 4.8 | 67 | 42 | 9.5 | 0.4 |
| 94 | 2430 | 99.8 | 9.2 | 5.8 | 66 | 41 | 9.2 | 0.5 |
| 95 | 2660 | 101.2 | 10.8 | 4.0 | 68 | 42 | 11.5 | 0.5 |
| 96 | 2600 | 100.8 | 11.2 | 5.3 | 67 | 41 | 11.4 | 0.5 |
| 97 | 2560 | 100.5 | 11.8 | 7.7 | 67 | 42 | 11.9 | 0.5 |
| 98 | 2500 | 101.4 | 9.8 | 3.8 | 69 | 44 | 9.6 | 0.4 |
| 99 | 2430 | 101.2 | 9.9 | 5.2 | 67 | 41 | 9.2 | 0.4 |
| 100 | 2400 | 100.9 | 10.4 | 6.1 | 66 | 42 | 9.8 | 0.5 |

The examples below (101 to 131) relate to the admixture of conventional solution ABS with the molding materials according to the invention. This conventional solution ABS is in each case referred to as component A, and the molding materials according to the invention as component B. Components A and B were mixed with one another as granules in the stated weight ratio and jointly melted in the extruder at 280° C., mixed and granulated as a blended product.

EXAMPLES 101 to 106

Component A employed was a solution ABS having the following properties:

| Rubber particle size d$_{50}$ | 4.0 μm |
| Rubber content (Buna HX 529 C) | 17.0% by weight |
| Viscosity of the PSAN matrix | 79.4 ml/g |

Component B was a molding material according to the invention which had been prepared in accordance with the procedure of Examples 13–16:

| Rubber particle size d$_{50}$ | 0.4 μm |
| Block rubber content (Buna BL 6533, Bayer AG) | 17.0% by weight |
| Additionally adducted polystyrene | 10.7% by weight |
| Viscosity of the adducted polystyrene | 74.0 ml/g |
| Viscosity of the PSAN matrix | 79.4 ml/g |
| Styrene content of the PSAN matrix | 75.0% by weight |
| Acrylonitrile content of the PSAN matrix | 25.0% by weight |
| Surface gloss (condition A) | 68.0% |
| Surface gloss (condition B) | 43.0% |

| Ex. | Component A [parts by wt.] | Component B [parts by wt.] | Notched impact strength 23° C. [kJ/m$^2$] | Notched impact strength −40° C. [kJ/m$^2$] | Modulus of elasticity [N/mm$^2$] | Surface gloss Cond. A [%] | Surface gloss Cond. B [%] |
|---|---|---|---|---|---|---|---|
| 101 | 100 | — | 17.7 | 12.5 | 1750 | 49 | 17 |
| 102 | — | 100 | 17.9 | 5.6 | 2600 | 68 | 43 |
| 103 | 5 | 95 | 18.7 | 6.5 | 2560 | 67 | 43 |
| 104 | 10 | 90 | 19.5 | 8.1 | 2500 | 67 | 41 |
| 105 | 20 | 80 | 19.4 | 8.9 | 2410 | 65 | 42 |
| 106 | 30 | 70 | 19.3 | 9.6 | 2350 | 61 | 38 |

Examples 107 to 111

Component A employed was a solution ABS having the following properties:

| Rubber particle size d$_{50}$ | 4.0 μm |
| Rubber content (Buna HX 529 C, Bayer AG) | 17.0% by weight |
| Viscosity of the PSAN matrix | 79.4 ml/g |
| Styrene content of the PSAN matrix | 75.0% by weight |
| Acrylonitrile content of the PSAN matrix | 25.0% by weight |

Component B was a molding material according to the invention which had been produced in accordance with the procedure of Example 58:

| Rubber particle size d$_{50}$ | 0.5 μm |
| Block rubber content (Buna BL 6533, Bayer AG) | 17.0% by weight |
| Additionally adducted polystyrene | 10.7% by weight |
| Limiting viscosity of the adducted polystyrene | 0.53 dl/g |
| Viscosity of the PSAN matrix | 78.9 ml/g |
| Styrene content of the PSAN matrix | 75.0% by weight |

-continued

| | Acrylonitrile content of the PSAN matrix | | | | 25.0% by weight | |
|---|---|---|---|---|---|---|
| | Component A | Component B | Notched impact strength | | Modulus of elasticity | Surface gloss |
| Ex. | [parts by wt.] | [parts by wt.] | 23° C. [kJ/m$^2$] | −40° C. [kJ/m$^2$] | [N/mm$^2$] | Cond. A [%] | Cond. B [%] |
| 101 | 100 | — | 17.7 | 12.5 | 1750 | 49 | 17 |
| 107 | — | 100 | 11.2 | 4.1 | 2800 | 65 | 41 |
| 108 | 5 | 95 | 13.4 | 5.8 | 2630 | 64 | 40 |
| 109 | 10 | 90 | 14.6 | 6.3 | 2570 | 63 | 40 |
| 110 | 20 | 80 | 14.6 | 7.4 | 2490 | 59 | 37 |
| 111 | 30 | 70 | 14.8 | 8.2 | 2350 | 54 | 32 |

Examples 112 to 116

Component A employed was a solution ABS having the following properties:

| Rubber particle size d$_{50}$ | 4.0 μm |
|---|---|
| Rubber content (Buna HX 5Z9C, Bayer AG) | 17.0% by weight |
| Viscosity of the PSAN matrix | 79.4 ml/g |
| Styrene content of the PSAN matrix | 75.0% by weight |
| Acrylonitrile content of the PSAN matrix | 25.0% by weight |

Component B was a molding material according to the invention which had been produced in accordance with the procedure of Example 30:

| Rubber particle size d$_{50}$ | 0.4 μm |
|---|---|
| Block rubber content (Buna BL 6533, Bayer AG) | 17.0% by weight |
| Additionally adducted polycyclohexyl methacrylate | 10.7% by weight |
| Viscosity of the polycyclohexyl methacrylate | 55.0 ml/g |
| Viscosity of the PSAN matrix | 78.4 ml/g |
| Styrene content of ths PSAN matrix | 75.0% by weight |
| Acrylonitrile content of the PSAN matrix | 25.0% by weight |

| | Component A | Component B | Notched impact strength | | Modulus of elasticity | Surface gloss | |
|---|---|---|---|---|---|---|---|
| Ex. | [parts by wt.] | [parts by wt.] | 23° C. [kJ/m$^2$] | −40° C. [kJ/m$^2$] | [N/mm$^2$] | Cond. A [%] | Cond. B [%] |
| 101 | 100 | — | 17.7 | 12.5 | 1750 | 49 | 17 |
| 112 | — | 100 | 9.8 | 4.5 | 2600 | 68 | 43 |
| 113 | 5 | 95 | 11.2 | 5.1 | 2520 | 67 | 42 |
| 114 | 10 | 90 | 12.9 | 6.0 | 2480 | 67 | 41 |
| 115 | 20 | 80 | 13.4 | 7.1 | 2390 | 65 | 40 |
| 116 | 30 | 70 | 14.0 | 7.9 | 2360 | 61 | 37 |

Examples 117 to 121

Component A employed was a solution ABS having the following properties:

| Rubber particle size d$_{50}$ | 4.0 μm |
|---|---|
| Rubber content (Buna HX 529 C, Bayer AG) | 17.0% by weight |
| Viscosity of the PSAN matrix | 79.4 ml/g |
| Styrene content of the PSAN matrix | 75.0% by weight |
| Acrylonitrile content of the PSAN matrix | 25.0% by weight |

Component B was a molding material according to the invention which had been prepared in accordance with the procedure of Example 70:

| Rubber particle size d$_{50}$ | 0.5 μm |
|---|---|
| Block rubber content (Buna BL 6533, Bayer AG) | 17.0% by weight |
| Additionally adducted polystyrene | 6.2% by weight |
| Viscosity of the polystyrene | 74.0 dl/g |
| Additionally adducted polyphenylene ether | 1.5% by weight |
| Limiting viscosity of the polyphenylene ether | 0.53 dl/g |
| Viscosity of the PSAN matrix | 77.4 ml/g |
| Styrene content of the PSAN matrix | 75.0% by weight |
| Acrylonitrile content of the PSAN matrix | 25.0% by weight |

| | Component A | Component B | Notched impact strength | | Modulus of elasticity | Surface gloss | |
|---|---|---|---|---|---|---|---|
| Ex. | [parts by wt.] | [parts by wt.] | 23° C. [kJ/m$^2$] | −40° C. [kJ/m$^2$] | [N/mm$^2$] | Cond. A [%] | Cond. B [%] |
| 101 | 100 | — | 17.7 | 12.5 | 1750 | 49 | 17 |
| 117 | — | 100 | 12.1 | 4.1 | 2600 | 68 | 42 |
| 118 | 5 | 95 | 12.9 | 5.0 | 2540 | 67 | 41 |
| 119 | 10 | 90 | 13.4 | 5.6 | 2500 | 66 | 40 |
| 120 | 20 | 80 | 13.4 | 6.1 | 2470 | 65 | 38 |
| 121 | 30 | 70 | 14.1 | 7.6 | 2430 | 60 | 36 |

Examples 122 to 126

Component A employed was a solution ABS having the following properties:

| | |
|---|---|
| Rubber particle size $d_{50}$ | 4.0 μm |
| Rubber content (Buna HX 529 C, Bayer AG) | 17.0% by weight |
| Viscosity of the PSAN matrix | 79.4 ml/g |
| Styrene content of the PSAN matrix | 75.0% by weight |
| Acrylonitrile content of the PSAN matrix | 25.0% by weight |

Component B was a molding material according to the invention which had been prepared in accordance with the procedure of Example 42:

| | |
|---|---|
| Rubber particle size $d_5$ | 0.4 μm |
| Block rubber content (Buna BL 6533, Bayer AG) | 17.0% by weight |
| Additionally adducted polystyrene | 6.2% by weight |
| Viscosity of the polystyrene | 74.0 ml/g |
| Additionally adducted polycyclohexyl methacrylate | 1.5% by weight |
| Viscosity of the polycyclohexyl methacrylate | 55.0 ml/g |
| Viscosity of the PSAN matrix | 77.4 ml/g |
| Styrene content of the PSAN matrix | 75.0% by weight |
| Acrylonitrile content of the PSAN matrix | 25.0% by weight |

| Ex. | Component A [parts by wt.] | Component B [parts by wt.] | Notched impact strength 23° C. [kJ/m²] | Notched impact strength −40° C. [kJ/m²] | Modulus of elasticity [N/mm²] | Surface gloss Cond. A [%] | Surface gloss Cond. B [%] |
|---|---|---|---|---|---|---|---|
| 101 | 100 | — | 17.7 | 12.5 | 1750 | 49 | 17 |
| 122 | — | 100 | 12.1 | 4.3 | 2550 | 68 | 44 |
| 123 | 5 | 95 | 12.7 | 5.2 | 2500 | 67 | 42 |
| 124 | 10 | 90 | 13.3 | 5.7 | 2460 | 66 | 40 |
| 125 | 20 | 80 | 13.4 | 6.4 | 2410 | 66 | 39 |
| 126 | 30 | 70 | 13.9 | 7.8 | 2380 | 60 | 36 |

Examples 127 to 131

Component A employed was a solution ABS having the following properties:

| | |
|---|---|
| Rubber particle size $d_{50}$ | 4.0 μm |
| Rubber content (Buna HX 529 C, Bayer AG) | 17.0% by weight |
| Viscosity of the PSAN matrix | 79.4 ml/g |
| Styrene content of the PSAN matrix | 75.0% by weight |
| Acrylonitrile content of the PSAN matrix | 25.0% by weight |

Component B was a molding material according to the invention which had been prepared in accordance with the procedure of Example 87:

| | |
|---|---|
| Rubber particle size $d_{50}$ | 0.4 μm |
| Block rubber content (Buna BL 6533, Baysr AG) | 16.0% by weight |
| Homopolybutadiene (Buna HX 500, Bayer AG) | 3.9% by weight |
| Additionally adducted polystyrene | 9.0% by weight |
| Viscosity of the polystyrene | 74.0 ml/g |
| Viscosity of the PSAN matrix | 77.4 ml/g |
| Styrene content of the PSAN matrix | 75.0% by weight |
| Acrylonitrile content of the PSAN matrix | 25.0% by weight |

| Ex. | Component A [parts by wt.] | Component B [parts by wt.] | Notched impact strength 23° C. [kJ/m²] | Notched impact strength −40° C. [kJ/m²] | Modulus of elasticity [N/mm²] | Surface gloss Cond. A [%] | Surface gloss Cond. B [%] |
|---|---|---|---|---|---|---|---|
| 101 | 100 | — | 17.7 | 12.5 | 1750 | 49 | 17 |
| 127 | — | 100 | 14.9 | 6.2 | 2520 | 68 | 43 |
| 128 | 5 | 95 | 16.8 | 7.2 | 2490 | 67 | 42 |
| 129 | 10 | 90 | 17.1 | 7.8 | 2430 | 67 | 40 |
| 130 | 20 | 80 | 17.0 | 8.5 | 2380 | 65 | 38 |
| 131 | 30 | 70 | 17.2 | 9.3 | 2340 | 60 | 32 |

We claim:

1. A rubber-modified, impact-resistant acrylonitrile-butadiene-styrene (ABS) molding material, as obtained by bulk or solution polymerizing styrene and acrylonitrile in the presence of a preformed rubber, dissolved in monomeric styrene and acrylonitrile and optionally a solvent, wherein the rubber is a styrene-butadiene block copolymer and in addition at least one further polymer which is compatible with the styrene-butadiene block rubber or its polystyrene component and is incompatible with polystyrene-acrylonitrile wherein the further polymer is used in the amount of no more than 30% by weight based on the polystyrene-acrylonitrile.

2. A molding material as claimed in claim 1, containing a polybutadiene rubber in addition to a styrene-butadiene block rubber.

3. A rubber molding material as claimed in claim 1, wherein said at least one further polymer is selected from the group consisting of polystyrene, polycyclohexyl (meth)acrylate, polyphenylene ether and mixtures thereof.

4. A process for the preparation of a molding material as claimed in claim 1, which comprises subjecting styrene and acrylonitrile to conventional bulk or solution polymerization in a reaction mixture containing, as the rubber, a styrene-butadiene block rubber and at least one further polymer in addition to styrene, acrylonitrile, an initiator and optionally a solvent, said at least one further polymer being compatible with the styrene-butadiene block rubber or the polystyrene component thereof and being incompatible with polystyrene-acrylonitrile.

5. A rubber-modified, impact-resistant acrylonitrile-butadiene-styrene (ABS) molding material, as obtained by polymerizing, in solution in at least two reaction zones or stages until a conversion of at least 40% is achieved, styrene and acrylonitrile in the presence of a preformed styrene-butadiene block copolymer rubber, dissolved in monomeric styrene and acrylonitrile and optionally a solvent, and in the presence of a further polymer compatible with the styrene-butadiene block rubber or its polystyrene component selected from the group consisting of polystyrene, polycyclohexyl (meth)acrylate, polyphenylene ether and mixtures thereof, wherein the further polymer is used in the amount of no more than 30% by weight based on polystyrene-acrylonitrile.

6. A material as claimed in claim 5, as obtained by subjecting styrene and acrylonitrile to conventional free-radical polymerization in a reaction mixture containing, in addition to styrene, acrylonitrile and an initiator as the rubber, a styrene-butadiene block rubber, optionally a solvent and a further polymer compatible with the styrene-butadiene block rubber or the polystyrene component thereof and incompatible with polystyrene-acrylonitrile, said further polymer being selected from the group consisting of polystyrene, polycyclohexyl (meth)acrylate, polyphenylene ether and mixtures thereof.

7. A molding material as claimed in claim 5 or 6, containing a polybutadiene rubber in addition to a styrene-butadiene block rubber.

8. The process as claimed in claim 4, wherein said at least one further polymer is used in the amount of no more than 30% by weight based on polystyrene-acrylonitrile.

* * * * *